United States Patent [19]

Malmquist et al.

[11] Patent Number: 4,760,515
[45] Date of Patent: Jul. 26, 1988

[54] ARBITRATION APPARATUS FOR DETERMINING PRIORITY OF ACCESS TO A SHARED BUS ON A ROTATING PRIORITY BASIS

[75] Inventors: Carl A. Malmquist, Vestal, N.Y.; John D. Wilson, Matthews, N.C.

[73] Assignee: International Business Machines Corporation, Armonk, N.Y.

[21] Appl. No.: 791,647

[22] Filed: Oct. 28, 1985

[51] Int. Cl.[4] ............................................. G06F 13/18
[52] U.S. Cl. ................................................... 364/200
[58] Field of Search ................... 364/200 MS, 900 MS

[56] References Cited

U.S. PATENT DOCUMENTS

| 3,964,054 | 6/1976 | Annunziata et al. | 364/200 |
|---|---|---|---|
| 4,009,470 | 2/1977 | Danilenko et al. | 364/200 |
| 4,091,455 | 5/1978 | Woods et al. | 364/200 |
| 4,103,329 | 7/1978 | Davis et al. | 364/200 |
| 4,209,838 | 6/1980 | Alcorn, Jr. et al. | 364/200 |
| 4,229,791 | 10/1980 | Levy et al. | 364/200 |
| 4,417,304 | 11/1983 | Dinwiddie, Jr. | 364/200 |
| 4,438,489 | 3/1984 | Heinrich et al. | 364/200 |
| 4,449,183 | 5/1984 | Flahive et al. | |
| 4,463,445 | 7/1984 | Grimes | 364/900 |
| 4,470,112 | 9/1984 | Dimmick | 364/200 |
| 4,488,218 | 12/1984 | Grimes | 364/200 |
| 4,536,839 | 8/1985 | Shah et al. | 364/200 |

OTHER PUBLICATIONS

Paper written by W. L. Bain, Jr. and S. R. Ahuja entitled "Performance Analysis of High Speed Digital Buses for Multiprocessing Systems".

Primary Examiner—Gary V. Harkcom
Assistant Examiner—Randy W. Lacasse
Attorney, Agent, or Firm—John H. Bouchard

[57] ABSTRACT

An arbitration apparatus for use within a computer system comprises a plurality of individual arbiters arranged in a particular configuration wherein some individual arbiters are higher in the particular configuration than a specific arbiter and some individual arbiters are lower in the particular configuration than the specific arbiter. Each arbiter has a request terminal for receiving access request signals, requesting access to a shared system bus, and an enable terminal for receiving an enabling signal. The enabling signal is generated and energizes the enable terminal of the specific arbiter if access requests are not received by higher arbiters in the particular configuration relative to the specific arbiter. If an access request signal energizes an arbiter and an enabling signal energizes the arbiter, an access grant signal is developed from the arbiter. If more than one access request signal energizes the arbiter at the same time, a command rotor, connected to the arbiter, determines the priority of access of the request signals to the shared bus in response to the "rotation" of the command rotor. If the access request signal is of a predetermined type, a pre-emptive grant signal may be developed from its arbiter even in the absence of an access request if there are no higher requests and no lower grants. If a refresh request is received by an arbiter when its enabling signal is not received, the refresh request is latched, and a refresh takes place when the enabling signal is finally generated.

6 Claims, 10 Drawing Sheets

ARBITRATION APPARATUS FOR DETERMINING PRIORITY OF ACCESS TO A SHARED BUS ON A ROTATING PRIORITY BASIS

BACKGROUND OF THE INVENTION

1. Field of the Invention

The subject matter of the present invention pertains to computer systems, and more particularly, to an arbitration mechanism which resolves priority of access to a shared bus based on a rotating priority scheme, the scheme being selectively changeable by the user.

2. Description of the Prior Art

In a computer system, various processors and input/output units disposed within the computer system may require access to a common shared data bus at approximately the same time. However, the data bus can handle only one access at a time. Therefore, some mechanism must be utilized to determine which unit and which processor may be granted access to the bus.

Various arbitration mechanisms have been utilized by prior art computer systems. In an article entitled "Performance Analysis of High Speed Digital Buses for Multiprocessing Systems" by W. L. Bain and S. R. Ahuja, Bell Laboratories, Murray Hill, N.J., several arbitration mechanisms are discussed. For example, the article discusses the Static Priority Algorithm, the Fixed Time Slice Algorithm, Dynamic Priority Algorithms including the Least Recently Used Algorithm and the Rotating Daisy Chain Algorithm, and the First Come First Served Algorithm. This article is incorporated by reference into the specification of this application.

Most of the above identified prior art arbitration mechanisms arbitrate based on a fixed priority in descending order. None take into account the following special features: dual level input/output (I/O) requests for preventing I/O timeouts, a rotating, selectively changeable, highest priority at all I/O levels for preventing I/O lockouts, processor bus operation cycle steal requests for preventing processor lockouts, an instruction cache preemptive grant which saves one arbitration cycle, data cache inpage and castout operation in one cycle which saves one arbitration cycle, and Processor Bus Operation (PBO) grants during refresh for utilizing otherwise wasted cycles.

U.S. Pat. No. 4,449,183 to Flahive et al discloses a mechanism for granting access to a shared bus on a "rotating priority basis". However, the arbitration scheme discussed in this patent resembles the rotating daisy chain algorithm referenced above. There is no discussion of the above mentioned special features.

SUMMARY OF THE INVENTION

Accordingly, it is a primary object of the present invention to provide an improvement for the arbitration mechanisms of the prior art by supplying an arbitration mechanism which comprises a plurality of individual arbiters arranged in a particular configuration that resembles a parallel-like configuration, each arbiter having a request terminal for receiving access request signals and an enable terminal for receiving enabling signals and generating a grant signal, granting access to a shared bus, in response to the request signals and the enabling signal, an enabling signal not being generated for a particular arbiter when an access request signal energizes the request terminal of a higher arbiter in the particular configuration.

It is a further object of the present invention to supply an arbitration mechanism which comprises the plurality of arbiters arranged in the particular configuration, the particular arbiter ranking lower in priority vis-a-vis a higher arbiter in the configuration but higher in priority vis-a-vis a lower arbiter in the configuration, the lower arbiter denying access to the shared bus if any higher arbiter has granted access to the bus.

It is a further object of the present invention to supply an arbitration mechanism which provides a dual level of input/output (I/O) requests, that is, input/output command requests and input/output normal requests.

It is a further object of the present invention to supply an arbitration mechanism which provides a rotating, selectively changeable, priority of access to the shared bus when a plurality of access request signals energize an arbiter, the rotating, selectively changeable, priority of access being supplied by a command rotor attached to the arbiter for providing, to the plurality of access request signals, sequential access to a shared bus in response to the "rotation" of the command rotor.

It is a further object of the present invention to supply an arbitration mechanism which provides for processor bus operation (PBO) cycle steal (CS) requests.

It is a further object of the present invention to supply an arbitration mechanism which generates an instruction cache preemptive access grant, granting access to the shared bus, in the absence of an instruction cache access request, an instruction cache preemptive access grant to the shared bus being developed, even in the absence of an instruction cache access request, when no higher requests and no lower grants are present, no refresh cycle is pending, and arbitration is allowed to continue.

It is a further object of the present invention to supply an arbitration mechanism which provides data cache inpage and castout operation in one arbitration cycle.

It is a further object of the present invention to supply an arbitration mechanism which provides a Processor Bus Operation Cycle Steal (PBO CS) grant during refresh since the granting of the PBO CS request is not dependant upon the existence of a "no refresh pending" signal.

It is a further object of the present invention to supply an arbitration mechanism which grants to a refresh request access to a shared bus, thereby generating a refresh grant signal, in spite of the existence of access request signals energizing the request terminals of higher arbiters in the particular configuration, the refresh grant signal being generated when an allow arbitration signal is developed indicating that arbitration is allowed to continue.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 3a through 3b illustrate various embodiments of a command rotor illustrated in FIG. 2a;

DETAILED DESCRIPTION OF THE PREFERRED EMBODIMENT

Figure 1:
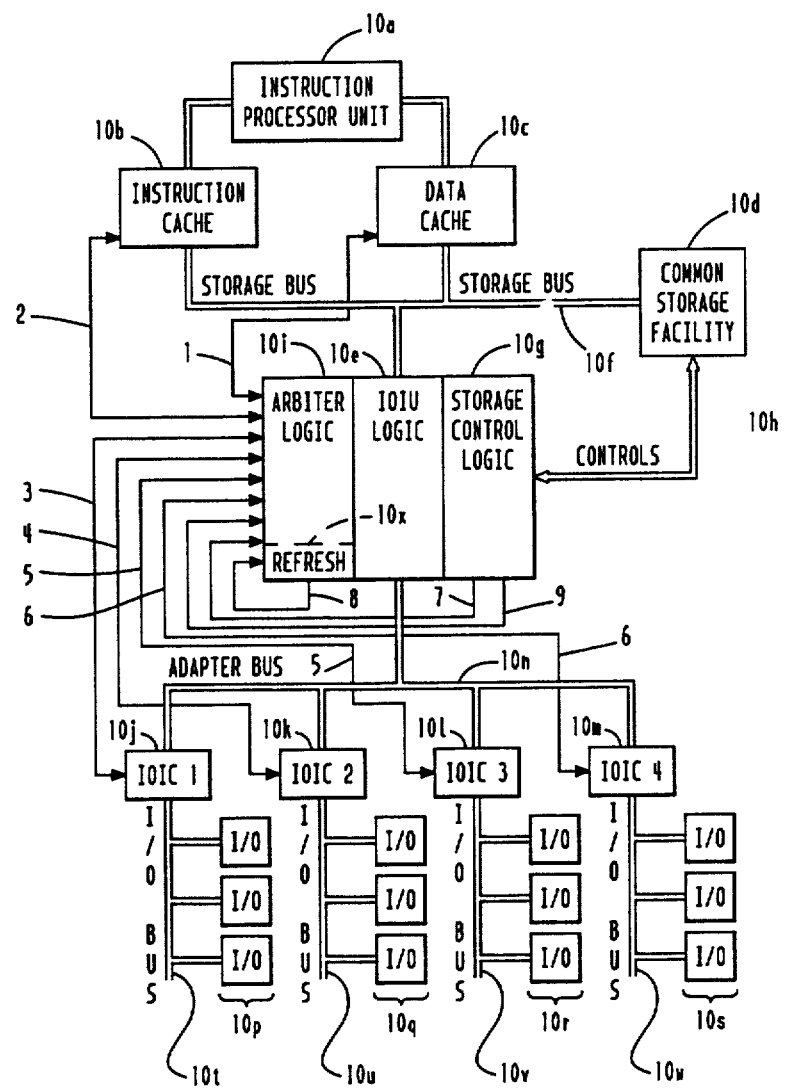
FIG. 1 illustrates a system block diagram of a computer system which incorporates an arbiter logic circuit, the arbitration mechanism of the present invention.

Referring to FIG. 1, a computer system 10, incorporating the arbiter logic circuit of the present invention, is illustrated. In FIG. 1, an instruction processor unit 10a is connected to an instruction cache (I-cache) 10b and a data cache (D-cache) 10c. The instruction cache 10b and the data cache 10c are further connected to a common storage facility 10d and to an input/output interface unit logic circuit (IOIU logic) 10e via a storage bus 10f. A storage control logic circuit 10g is connected to the common storage facility 10d via a control bus 10h and interfaces with the IOIU logic circuit 10e. The IOIU logic circuit 10e further interfaces with an arbiter logic circuit 10i according to the present invention. Refresh logic 10x is disposed within said arbiter logic circuit 10i. The arbiter logic circuit 10i receives access requests from the instruction cache 10b via line 2 and from the data cache 10c via line 1. The IOIU logic circuit 10e is further connected to an input/output interface controller 1 (IOIC 1) 10j, to an input/output interface controller 2 (IOIC 2) 10k, to an input/output interface controller 3 (IOIC 3) 10L, and to an input/output interface controller 4 (IOIC 4) 10m via an adapter bus 10n. The arbiter logic circuit 10i receives access requests from IOIC 1 10j via line 3, from IOIC 2 10k via line 4, from IOIC 3 10L via line 5, and from IOIC 4 10m via line 6. The IOICs 10j, 10k, 10L, and 10m are connected to various I/O subunits 10p, 10q, 10r, and 10s via I/O buses 10t, 10u, 10v, and 10w, respectively. The arbiter logic circuit 10i receives bus adaptor access requests from the storage control logic 10g via line 7, an access request from the refresh logic 10x via line 8, and a PBO CS request from the storage control logic 10g via line 9.

The functional operation of the computer system of FIG. 1 will be described in the following paragraphs with reference to FIG. 1.

The instruction processor unit (IPU) 10a executes instructions stored in the instruction cache 10b utilizing data stored in the data cache 10c. The results of the execution of the instructions are stored in the common storage facility 10d. If it is necessary to transfer the results to various ones of the I/O subunits 10p, 10q, 10r, and 10s, the results are retrieved from the common storage facility 10d by the storage control logic 10g and are transferred to the adapter bus 10n via the IOIU logic 10e and to the I/O subunits 10p through 10s via the IOICs 10j through 10m. However, the instruction cache 10b, the data cache 10c, and/or one or more of the IOICs 10j through 10m may require access to the shared buses (storage bus 10f, and the adapter bus 10n) simultaneously. Since the shared buses can handle only one access at a time, some arbitration mechanism must be utilized to determine which unit will access the shared bus at a particular point in time. In order to make this determination, a plurality of units needing access, comprising the data cache 10c, the instruction cache 10b, the IOIC 1 10j, the IOIC 2 10k, the IOIC 3 10L, the IOIC 4 10m, the storage control logic 10g and the refresh logic 10x, each generate an access request signal which is directed to the arbiter logic 10i via lines 1 through 9. In accordance with a particular arbitration scheme, the arbiter logic 10i determines which of the plurality of units will access the shared bus. The particular arbitration scheme and the construction of the arbiter logic circuit 10i will be discussed in the paragraphs below with reference to FIGS. 2a through 7 of the drawings.

Figure 2A:
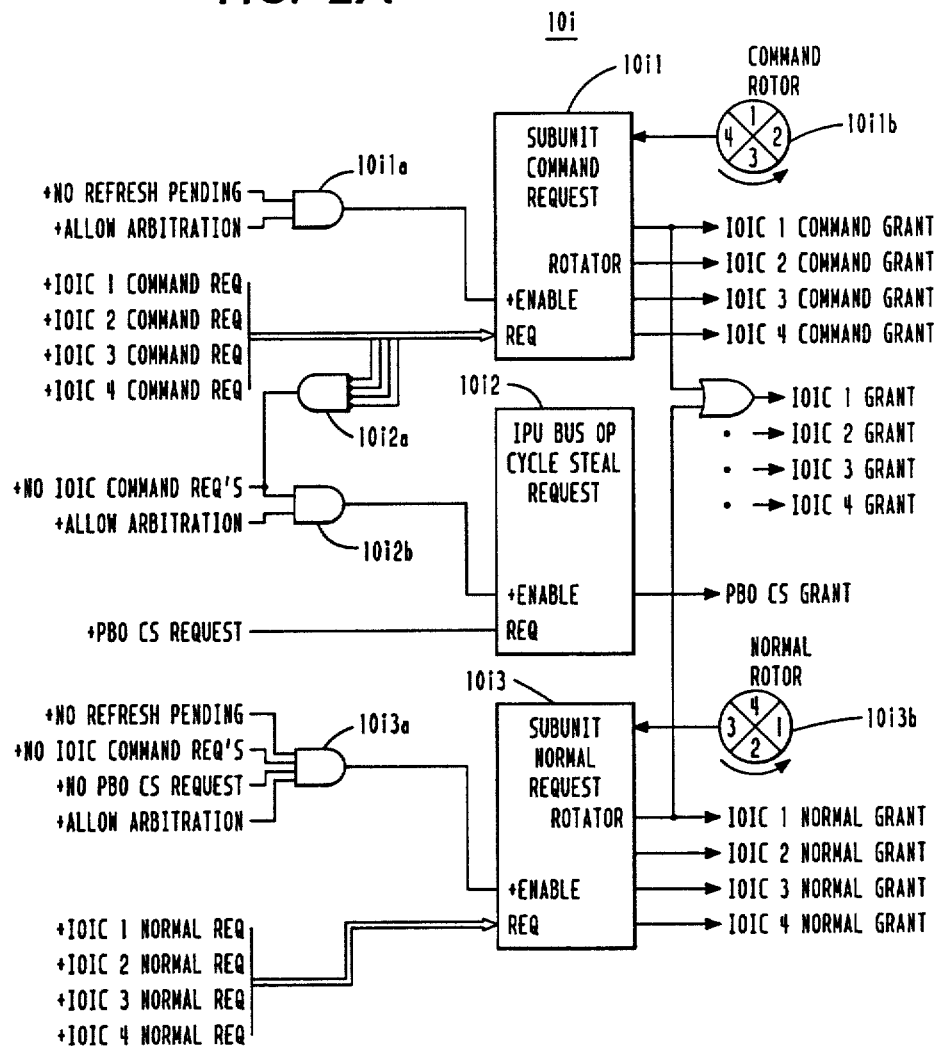
FIGS. 2a through 2c illustrate the construction of the arbiter logic circuit of FIG. 1 according to the present invention, the arbiter logic circuit including command rotors for providing a rotating, selectively changeable, priority for all subunits at all I/O levels and a plurality of individual arbiters for determining if a subunit shall access the shared bus.
Figure 2B:
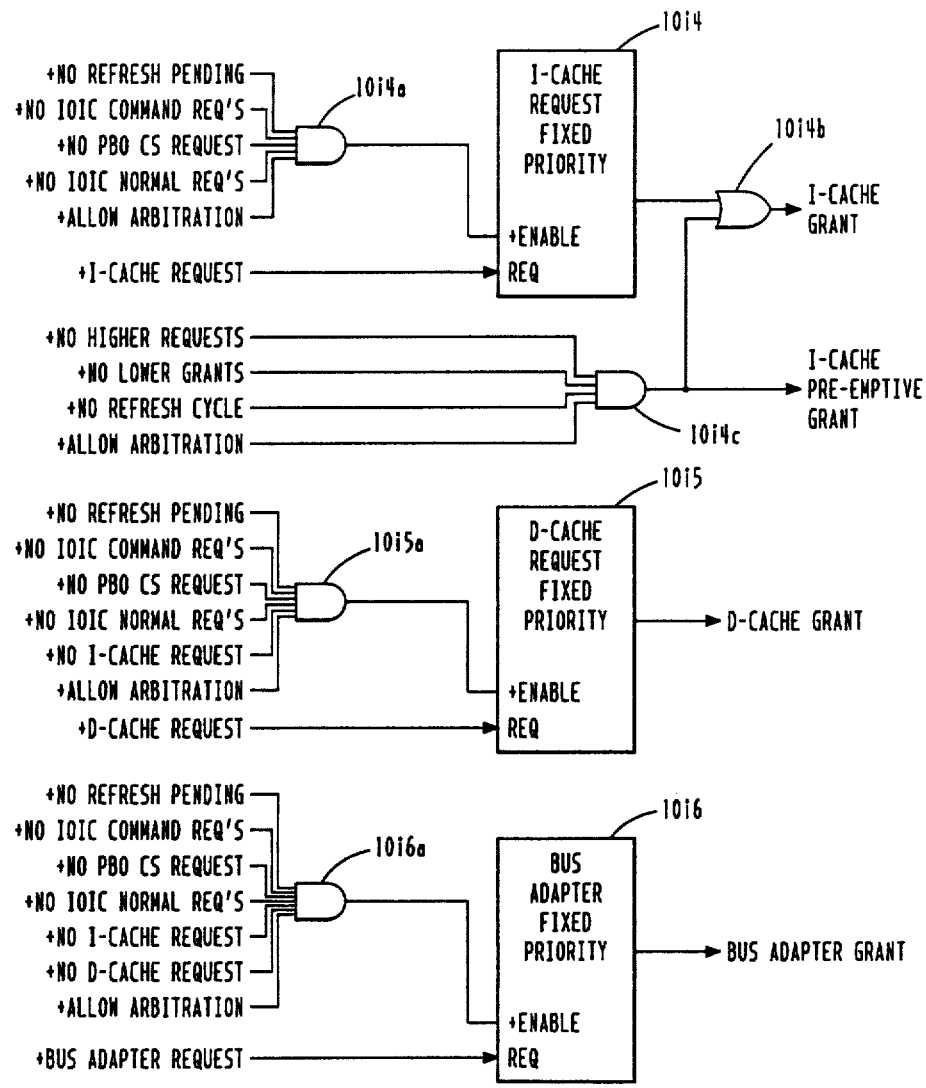
Figure 2C:
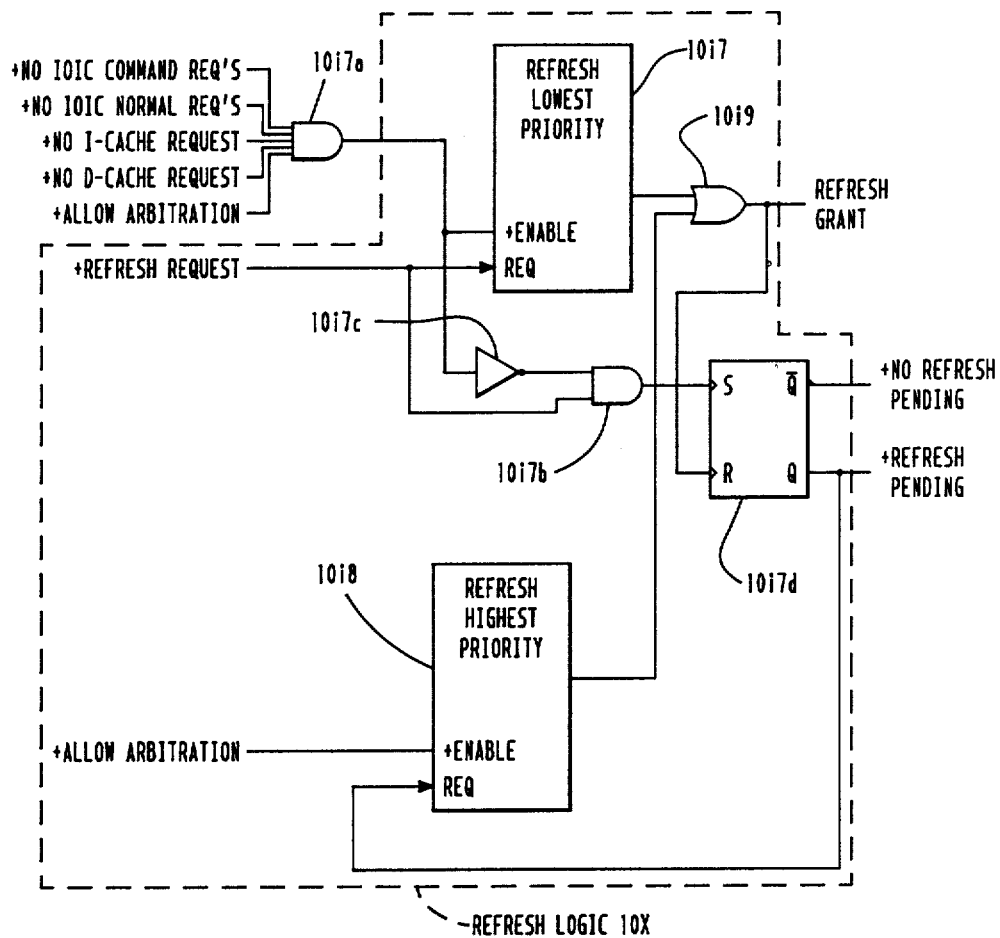

Referring to FIGS. 2a through 2c, a block diagram representing the construction of the arbiter logic circuit 10i is illustrated.

Referring to FIG. 2a, the arbiter logic circuit 10i comprises a plurality of individual arbiters arranged, in the drawings, in priority order. A first individual arbiter 10i1, first in order of priority relative to other individual arbiters, represents the IOIC command request rotator arbiter. The first arbiter receives command access requests from the IOICs 10j through 10m. A second individual arbiter 10i2, second in order of priority relative to other individual arbiters, represents the IPU bus operation cycle steal request arbiter. The second arbiter receives the processor bus operation (PBO) cycle steal access requests from the storage control logic 10g after decoding an IPU request. A third individual arbiter 10i3, third in order of priority relative to other individual arbiters, represents the IOIC normal request rotator arbiter used for data transfers. This second IOIC level of arbitration prevents the normal data transfers from interfering with the command transfers which could cause device overruns. The third arbiter receives normal requests from the IOIC subunits 10j through 10m.

Referring to FIG. 2b, a fourth individual arbiter 10i4, fourth in order of priority relative to other individual arbiters, represents an I-cache request fixed priority arbiter The fourth arbiter receives access requests from the instruction cache 10b. A fifth individual arbiter 10i5, fifth in order of priority relative to other individual arbiters, represents a D-cache request fixed priority arbiter The fifth arbiter receives access requests from the data cache 10c. A sixth individual arbiter 10i6, sixth in order of priority relative to other individual arbiters, represents a bus adapter, fixed priority, arbiter. The sixth arbiter receives access requests from the storage control logic 10g.

Referring to FIG. 2c, the refresh logic 10x is illustrated. The refresh logic 10x comprises a seventh individual arbiter 10i7, seventh and last in order of priority relative to the other individual arbiters. The seventh arbiter 10i7 represents a refresh arbiter. This arbiter receives refresh access requests for refreshing the common storage facility 10d from the refresh timer located within the arbiter 10i.

Referring to FIG. 2a, the first individual arbiter 10i1 has a request input terminal and an enable input terminal. The request input terminal is connected, in parallel, to each of IOIC's 1 through 4 representing I/O subunits 10p, 10q, 10r, and 10s, respectively, of FIG. 1. The enable input terminal of the first individual arbiter 10i1 is connected to an output terminal of a AND gate 10i1a. The input terminals of the AND gate 10i1a receive the "no refresh pending" input signal and the "allow arbitration" input signal. The AND gate 10i1a has the following truth table: all inputs must be positive for the output to be positive; any inputs which are negative will cause the output to be negative.

The first individual arbiter 10i1 is connected to a first command rotor 10i1b. The command rotor 10i1b stores numbers 1 through 4 corresponding to subunits 1 through 4, respectively, the command requests of which are being input to the request input terminal of the first individual arbiter 10i1. Although the command rotor 10i1b stores, in FIG. 2a, numbers 4, 1, 2, and 3, in sequence, any sequence of numbers may be stored in the command rotor. For example, command rotor 10i1b could easily store numbers 1, 1, 2, 3, or numbers 1, 2, 3, 3, etc. In FIG. 2a, the command rotor 10i1b may be depicted as "rotating". That is, as the command rotor "rotates", numbers 4, 1, 2, 3 will be input to the first individual arbiter 10i1 representing IOIC's 4, 1, 2, and 3, in sequence.

The rotors are not limited to four entries, they may contain any number of entries. The number of entries or slots available will determine the granularity of the percent priority each entry possesses.

The functional operation of the first individual arbiter 10i1 will be described in the following paragraph with reference to FIG. 2a.

Assume that IOIC's command requests are being input to arbiter 10i1 by all four IOIC's 1–4. Therefore, the request input terminal of arbiter 10i1 is receiving four command request signals from IOIC's 1 through 4, respectively. Further, assume that the command rotor 10i1b is positioned as shown in FIG. 2a, that is, the number 4 is being input to arbiter 10i1. This first arbiter 10i1 can be thought of as an arbiter having 4 input request lines but containing 5 levels of fixed descending priority arbitration. The top priority level is determined by the value contained in the rotor 10i1b. If the "no refresh pending" signal and the "allow arbitration" signal are positive (meaning that there is no refresh pending and there is no data transfer operation or refresh operation in progress, which would prohibit arbitration), a positive signal energizes the enable terminal of arbiter 10i1. As the command rotor 10i1b begins to "rotate", IOIC's 4, 1, 2, and 3 are sequentially granted access to the shared bus. Therefore, command request signals corresponding to IOIC's 4, 1, 2, and 3 sequentially energize the shared bus. If either or both of the "no refresh pending" or "allow arbitration" signals are not positive, a negative signal energizes the enable terminal of arbiter 10i1. If a negative signal energizes the enable terminal, IOIC's 1–4 are all denied access to the shared bus.

Access to the shared bus by IOIC's 1–4 via arbiter 10i1 is higher in priority than a PBO cycle steal access request to the shared bus via arbiter 10i2. If IOIC's 1–4 are not requesting access to the shared bus via arbiter 10i1, the PBO cycle steal request via arbiter 10i2 may be granted. The IOIC command requests via arbiter 10i1 have highest priority, among the arbiters of FIGS. 2a–2c, and the PBO cycle steal request via arbiter 10i2 has secondary priority.

The enable terminal of arbiter 10i2 is connected to the output terminal of another AND gate 10i2b having a truth table which is the same as the truth table for AND gate 10i1a. The input terminals of AND gate 10i2b receive the "allow arbitration" signal and the "no IOIC command requests" signal. The "no IOIC command requests" signal represents an output signal from a negative AND gate 10i2a.

It is noted that the IOIC command access requests (IOIC 1 command req, IOIC 2 command req, etc), which energize the request terminal of arbiter 10i1, also energize the input terminals of the negative AND gate 10i2a. Therefore, if any IOIC command request is high, the output of negative AND gate 10i2a is low, whereas, if all IOIC command requests are low, the output of negative AND gate 10i2a is high. The output of AND gate 10i2a is appropriately labelled "+no IOIC command req's". This labelling convention indicates that, if there are no high (active) IOIC command requests energizing the request terminal of arbiter 10i1, the first input terminal of AND gate 10i2b is high. This labelling convention is used throughout the specification of this application. For example, the "+no PBO CS request" signal energizing AND gate 10i3a is high if there is no PBO CS REQUEST signal energizing the request terminal of arbiter 10i2. Throughout the specification, it may be implied that either an inverter or a negative AND gate would be utilized in generating the "no---" signal, as exemplified above, in implementing the labelling convention.

If the "no IOIC command request" signal is positive (meaning that no IOIC command request lines via arbiter 10i1 are active), and the "allow arbitration" signal is positive (meaning that there is no signal which would prevent arbitration from continuing), the enable terminal of arbiter 10i2 is positive, and the PBO cycle steal request is granted access to the shared bus. The "no refresh pending" signal is absent as an input to the enable AND gate 10i2b. As a result, the PBO and Refresh operations are allowed to occur simultaneously.

Arbiter 10i3 receives IOIC 1–4 normal requests for access to the shared bus. If IOIC's 1–4 are not requesting access to the bus via arbiter 10i1, and if a PBO cycle steal request is not requesting access to the bus via arbiter 10i2, arbiter 10i3 may grant to the IOIC's 1–4 access to the bus. The IOIC normal requests via arbiter 10i3 rank third in order of priority, relative to arbiters 10i1 and 10i2. The enable terminal of arbiter 10i3 is connected to an output terminal of AND gate 10i3a. The input terminals of AND gate 10i3a receive the following input signals: "no refresh pending", "no IOIC command request", "no PBO CS request", and "allow arbitration". AND gate 10i3a has a truth table which is the same as that of AND gate 10i1a, that is, all positive inputs yield a positive output; any other combination yields a negative output. A negative signal, energizing the enable terminal of arbiter 10i3, will block all IOIC normal requests from gaining access to the shared bus via the request terminal of arbiter 10i3. A command rotor 10i3b is connected to the arbiter 10i3 and functions in the same manner as that of rotor 10i1b. Therefore, if a positive signal energizes the enable terminal of arbiter 10i3 (indicating no refresh pending, no IOIC command requests, no PBO cycle steal request, and nothing blocking arbitration), IOIC's 1–4 will be granted access to the bus via arbiter 10i3 in an order defined by the "rotation" of command rotor 10i3b. According to FIG. 2a, in response to a counterclockwise rotation of rotor 10i3b, IOIC's 1–4 will be given highest priority to the bus in the following order: subunits 3, 4, 1, and 2. If the selection for highest priority is not matched with its respective request, the remaining requests are handled in a fixed descending priority order.

In FIG. 2b, arbiter 10i4 receives an I-cache request at its request terminal. If access requests are not being received by arbiters 10i1, 10i2, or 10i3 of FIG. 2a, the I-cache request received by arbiter 10i4 may be granted access to the shared bus, provided the signal being received at the enable terminal of arbiter 10i4 is positive. Arbiter 10i4 ranks fourth in priority relative to arbiters 10i1, 10i2, and 10i3. The enable terminal of arbiter 10i4 is connected to the output of a AND gate 10i4a. The AND gate 10i4a possesses the same truth table as that of AND gate 10i3a. The input terminals of AND gate 10i4a receive the following input signals: "no refresh pending", "no IOIC command requests", "no PBO CS request", "no IOIC normal requests", and "allow arbitration". If any of the input signals being received by AND gate 10i4a are negative, a negative input signal is received at the enable terminal of arbiter 10i4 thereby blocking the I-cache request from gaining access to the shared bus. The output terminal of arbiter 10i4 is connected to an input terminal of the two input OR gate 10i4b. The second input of OR gate 10i4b is connected to the output terminal of AND gate 10i4c. The output terminal of OR gate 10i4b is labeled "I-cache grant". The output terminal of AND gate 10i4c is labeled "I-cache preemptive grant". The input terminals of AND gate 10i4c receive the following signals: "no higher requests", a positive signal indicating that no requests are being received by arbiters 10i1, 10i2, and 10i3; "no lower grants", a positive signal indicating that arbiters 10i5, 10i6 and 10i7, to be discussed below, have not granted access to the shared bus; "no refresh cycle", a positive signal indicating that a refresh cycle is not currently being performed; and "allow arbitration", a positive signal indicating that there are no signals which would prohibit arbitration from continuing. Assume that the enable terminal of arbiter 10i4 is positive and assume that an I-cache request has not yet been received at the request terminal of arbiter 10i4. If the "no higher req" and the "no lower grants" signals are positive, and if the "no refresh cycle" and the "allow arbitration" signals are positive, the AND gate 10i4c generates the "preemptive grant" signal which energizes OR gate 10i4b. An "I-cache grant" signal is generated from OR gate 10i4b. However, an I-cache request has not yet been received by arbiter 10i4. When the I-cache request is received, since the I-cache grant signal is already generated, the I-cache request will be given access to the shared bus on the next, succeeding machine cycle. This preemptive grant saves one machine cycle which improves system performance. (See FIG. 6 which shows the preemptive grant and FIG. 7 which shows the normal grant)

Arbiter 10i5 receives a D-cache request at its request terminal. This represents an access request to the shared bus from the data cache 10c. Arbiter 10i5 may grant the D-cache access request if arbiters 10i1, 10i2, 10i3, and 10i4 are not receiving access requests. Arbiter 10i5 ranks fifth in order of priority relative to arbiters 10i1 through 10i4. The enable terminal of arbiter 10i5 is connected to the output terminal of AND gate 10i5a. The AND gate 10i5a possesses a truth table which is the same as that of AND gates 10i4a and 10i3a. The input terminals of AND gate 10i5a receive the following input signals: "no refresh pending", a positive signal indicating that no refresh is pending; "no IOIC command requests" (see AND gate 10i2b description); "no PBO CS REQ" (see AND gate 10i3a description); "no IOIC normal requests" (see AND gate 10i4a description); "no I-cache request", a positive signal meaning that there is no I-cache request being received by arbiter 10i4; and "allow arbitration", a positive signal indicating nothing is prohibiting arbitration. If all of these signals are positive, a positive signal is received at the enable terminal of arbiter 10i5, and, as a result, the D-cache request, received at the request terminal of arbiter 10i5, is granted access to the shared bus.

Arbiter 10i6 receives a bus adapter access request from the storage control logic 10g at its request terminal. Arbiter 10i6 may grant the bus adapter access request if arbiters 10i1, 10i2, 10i3, 10i4, and 10i5 are not receiving access requests Arbiter 10i6 ranks sixth in order of priority relative to arbiters 10i1 through 10i5. The enable terminal of arbiter 10i6 is connected to an output terminal of the AND gate 10i6a. AND gate 10i6a receives the following input signals: "no refresh pending"; "no IOIC cmd requests" (to arbiter 10i1); "no PBO CS REQ" (to arbiter 10i2); "no IOIC normal requests" (to arbiter 10i3); "no I-cache req" (to arbiter 10i4); "no D-cache req", a positive signal indicating that a D-cache request is not received by the request terminal of arbiter 10i5; and "allow arbitration". If any one or more of the above input signals, energizing AND gate 10i6a, are negative, a negative signal energizes the enable terminal of arbiter 10i6. As a result, the bus adapter request signal from the storage control logic 10g energizing the request terminal of arbiter 10i6 is blocked and denied access to the shared bus.

Referring to FIG. 2c, refresh logic 10x, including arbiters 10i7 and 10i8, is illustrated. In FIG. 2c, arbiter 10i7 receives a refresh request signal at its request terminal. If arbiters 10i1, 10i2, 10i3, 10i4, 10i5, and 10i6 do not receive access requests, arbiter 10i7 may grant the refresh access request if the signal at its enable terminal is positive. Arbiter 10i7 ranks seventh in order of priority relative to arbiters 10i1 through 10i6. The enable terminal of arbiter 10i7 is connected to an output terminal of AND gate 10i7a. AND gate 10i7a possesses the same truth table as that of AND gate 106a and the other AND gates. AND gate 10i7a receives the following input signals: "no IOIC command requests", a positive signal indicating that IOIC's command requests are not received by arbiter 10i1; "no IOIC normal requests", a positive signal indicating that the subunit normal requests are not received by arbiter 10i3; "no I-cache request", a positive signal indicating that an I-cache request is not received by arbiter 10i4; "no D-cache request", a positive signal indicating that a D-cache request is not received by arbiter 10i5; and "allow arbitration", a positive signal indicating that no signal exists which would prevent arbitration from continuing. The enable terminal of arbiter 10i7 is also connected to an AND gate 10i7b via an inverter 10i7c. The other input terminal of the AND gate 10i7b is connected to the refresh request signal which is energizing the request terminal of the arbiter 10i7. The output of the AND gate 10i7b is connected to the set terminal of a set/reset latch circuit 10i7d. The Q output of the latch circuit 10i7d is connected to the request terminal of a further arbiter 10i8. The output terminal of the further arbiter 10i8 is connected to one input terminal of an OR gate 10i9. The other input terminal of the OR gate 10i9 is connected to the output terminal of the arbiter 10i7. The output terminal of the OR gate 10i9, labelled "refresh grant", is connected to the reset terminal of the latch circuit 10i7d. The Q output of the latch circuit 10i7d is labelled "+refresh pending" and the Q bar output of the latch circuit 10i7d is labelled "no refresh pending". This is the signal connected to the enable AND gates of arbiters 10i1, 10i3, 10i4, 10i5, 10i6.

The functional operation of the refresh logic 10x will be described in the following paragraph with reference to FIG. 2c.

If one of the input signals to AND gate 10i7a is negative, the enable terminal of arbiter 10i7 is negative. Therefore, if the "refresh request" signal is energizing the request terminal of arbiter 10i7, it will be blocked and denied access to the shared bus due to the existence of the negative signal at the arbiter's enable terminal. However, the negative signal at the arbiter's enable terminal is inverted via inverter 10i7c, a positive signal energizing one terminal of AND gate 10i7b. The other terminal of AND gate 10i7b is energized with the "refresh request" signal. Therefore, a positive output from the AND gate 10i7b sets the latch circuit 10i7d. A positive Q output signal (the +REFRESH PENDING signal) from the latch circuit 10i7d represents a refresh pending condition (which means that some higher request was active at the same time the refresh request was active and the refresh operation will be delayed until the other operation has completed). As soon as the other operation has completed the "allow arbitration" signal goes active which allows the output of arbiter 10i8 to become active. This output signal is fed to the input of OR gate 10i9 which now causes the refresh grant signal to be generated. Since the "refresh request" signal is only active for one cycle, the latch 10i7d will be set during the time some other storage operation is in progress. The Q-output signal of the latch circuit 10i7d, which generates the +REFRESH PENDING signal, signifies that a refresh operation is pending and will be taken as soon as the "allow arbitration" signal becomes active.

Figure 3A:
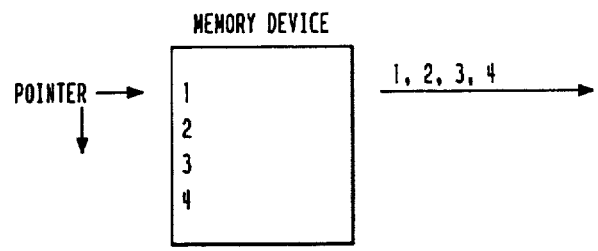

Referring to FIG. 3a, a simple construction of the command rotors 10i1b and 10i3b is illustrated. In FIG. 3a, the command rotor 10i1b and 10i3b may be a simple memory with a pointer addressing the memory. The memory would store the subunit numbers therein. For example, in FIG. 3a, subunit numbers 1 through 4 are stored in the memory. As the pointer addresses the memory, the subunit numbers 1, 2, 3, and 4 are read out in sequence.

Figure 3B:
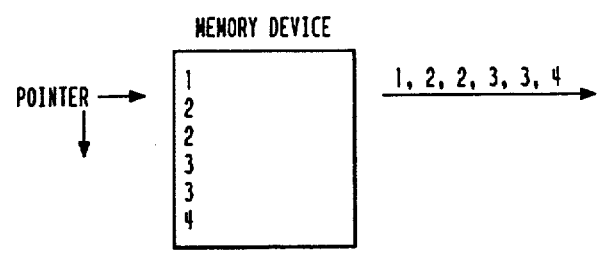

Referring to FIG. 3b, a similar simple construction of the command rotors 10i1b and 10i3b is illustrated. In FIG. 3b, the command rotors represent, as in FIG. 3a, a simple memory with a pointer addressing the memory. As the pointer addresses the memory, the subunit numbers stored therein are read out in sequence. However, in FIG. 3b, a different set of subunit numbers are stored in the memory. In fact, any set of subunit numbers may be stored in the memory. Therefore, the set of subunit numbers to be stored in the memory is selectively changeable by the user. In the FIG. 3b embodiment, subunit numbers 1, 2, 2, 3, 3, and 4 are read out in sequence. Consequently, if subunit 3 must be granted access to the shared bus more frequently than subunit 1, or subunit 4, the subunit number 3 should be stored a multiple number of times in the memory. The percentage of top priority grants is established by the number of times a subunits address appears in the memory array. The granularity of the percentage of highest priority is inversely proportional to the number of slots used. In other words, if only four memory slots were used, each subunit would be guaranteed highest priority 25% of the time. If eight slots were used, the percentage would be 12.5 thus giving 37.5% to a subunit having 3 entries.

Figure 4A:
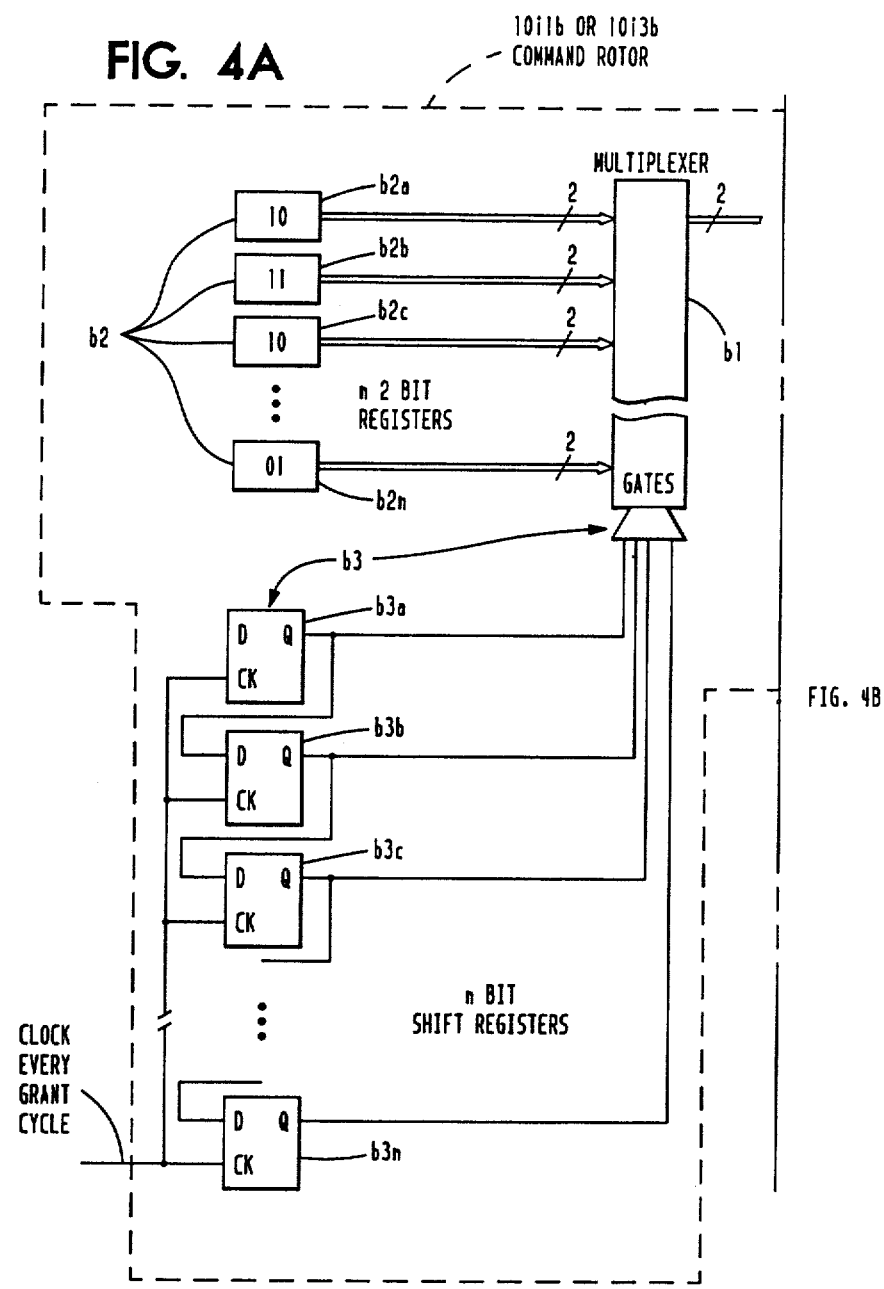
FIGS. 4A and 4B illustrate an alternate embodiment of the command rotor and the construction of each of said individual arbiters of FIGS. 2a through 2c.
Figure 4B:
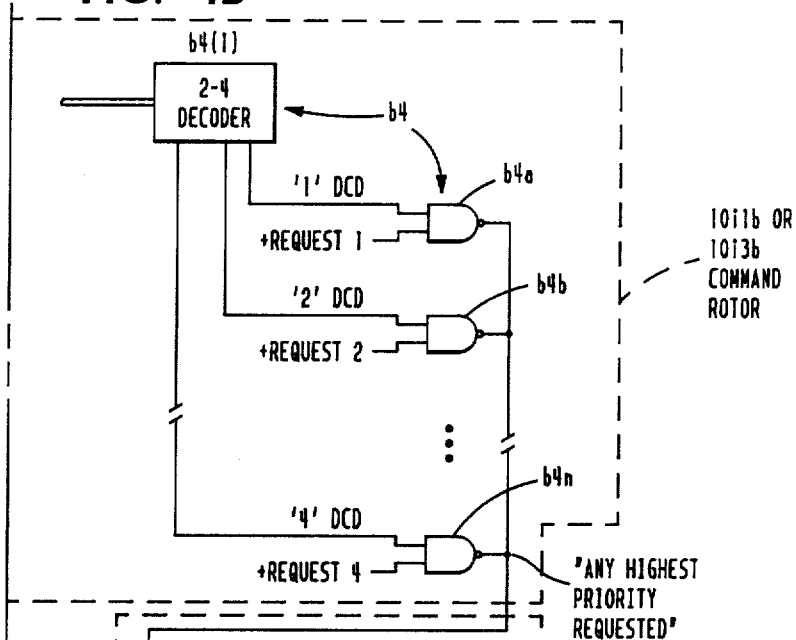
Figure 4B:
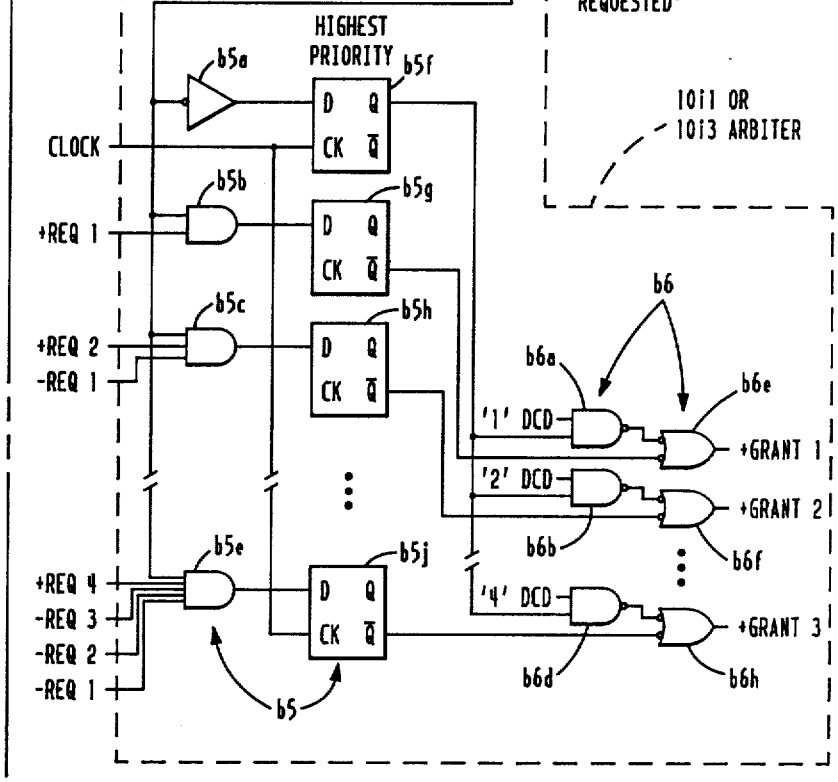

Referring to FIGS. 4A and 4B, an alternative construction of the command rotors 10i1b and 10i3b is illustrated. Further, a detailed construction of the arbiters 10i1 through 10i8 is illustrated.

In FIGS. 4A and 4B, method of implementing the command rotors 10i1b and 10i3b is shown. Each command rotor comprises a multiplexer b1, a plurality of registers b2 connected to the multiplexer b1, a gate means b3 connected to the multiplexer b1 for selecting one of the registers associated with the plurality of registers b2, and a decoder means b4 for decoding the output of the multiplexer b1 and for energizing the arbiter 10i1 or 10i3. The plurality of registers b2 comprise register b2a, b2b, b2c, ..., and b2n. The gate means b3 comprises latch circuit b3a, latch b3b, latch b3c, ..., and latch b3n. The decoder means b4 comprise decoder b4(1), gate b4a, gate b4b, ..., and gate b4n. Gates b4a through b4n are positive NAND gates. An access request is input to gate means b5 and a final grant is generated from gate means b6. In FIGS. 4A and 4B, One input terminal of each AND gate b5b through b5e and the input of inverter b5a is connected to the output of decoder means b4, and specifically, to the outputs of gates b4a through b4n. Another input terminal of AND gates b5b through b5e are connected to a positive request terminal (+request 1 through +request 4). The positive request terminals represent the request terminal associated with subunits 1 through 4 for arbiters 10i1 and 10i3. Another input terminal of AND gates b5a through b5e are connected to a negative request terminal. The negative requests associated with AND gate b5e (-request 1 through -request 3) represent the enable terminal of the arbiters 10i1 or 10i3. Grants 1 through 4 are generated from latches b5f through b5j via gates b6a through b6h.

Gates b6a, b6b, ..., b6d, associated with gates b6e, b6f, ..., b6h, receive an input 1DCD, 2DCD, ..., 4DCD. The inputs 1DCD, 2DCD, ..., and 4DCD, represent the individual outputs from decoder b4(1)

The functional operation of the command rotor 10i1b or 10i3b in association with an arbiter 10i1 or 10i3 will be described in the following paragraphs with reference to FIGS. 4A and 4B of the drawings A number is stored in each of the registers b2a, b2b, b2c, ..., b2n, each of the numbers representing a particular subunit command request, energizing the request terminal of arbiter 10i1, or representing a particular subunit normal request, energizing the request terminal of arbiter 10i3. Assume that the numbers, stored in these respective registers, are binary numbers "10, 11, 10, ..., and 01". The numbers are selected from each of the registers b2a, b2b, b2c, ..., and b2n, in sequence, starting with the binary number 10, by the gate means b3. Latch circuit b3a generates an output signal energizing gate b3 thereby selecting the output from register b2a, latch circuit b3b generating an output signal energizing gate b3 thereby selecting the output from register b2b, etc. In response to this selection, multiplexer b1 generates output signals representing the numbers stored in registers b2a, b2b, b2c, . . . , and b2n, respectively. The decoder b4(1) receives the output signals from the multiplexer b1 and develops corresponding output signals, in sequence, labeled 1DCD, 2DCD, . . . , 4DCD, starting with the "1DCD" output signal. These corresponding output signals developed from the decoder b4(1) sequentially energize a plurality of gates b4a, b4b, . . . , b4n. Each of these gates b4a, . . . ,b4n also simultaneously receive request signals labeled "+request 1, +request 2, . . . , +request 4". These request signals represent the IOIC command request signals energizing the arbiter 10i1 and the IOIC normal request signals energizing the arbiter 10i3. The gates b4a, b4b, . . . , b4n generate an output signal representing the fact that the selected highest priority, determined by the priority register selected by the gate means b3, matched its associated request signal and will therefore be granted access to the shared bus on the next cycle. This "- any highest priority requested" signal energizes inverter b5a which in turn activates the latch b5f. At the same time, gates b5b, b5c, . . . , and b5e will all be deselected by virtue of the negative signal on the first input terminal of each block. The Q output signal from latch b5f energizes one of the inputs of NAND gates b6a, b6b, . . . ,b6d and when ANDed with the same output from the decoder b4(1), signal "1DCD", "2DCD", . . . , or "4DCD", causes one of the gates b6a through b6d to go active. This active signal will energize the associated negative OR gate, b6e, b6f, . . . , b6h and the appropriate grant signal will occur.

If the "- any highest priority requested" signal is inactive, the first input terminal to gates b5b, b5c, . . . ,b5e, will be positive. This will allow the normal descending arbitration for the subunit request signals to occur.

The functional operation of the arbiter logic circuit 10i of FIG. 1, according to the present invention, will be described in the following paragraphs with reference to FIGS. 2a through 2c of the drawings.

Referring to FIG. 2a, assume IOIC's 1 thru 4 command request signals are received at the request terminal of arbiter 10i1, and assume, further, that rotor 10i1b is in the position as shown in FIG. 2a. If the "no refresh pending" signal and the "allow arbitration" signal are both positive, a positive signal energizes the enable terminal of arbiter 10i1. Therefore, as rotor 10i1b "rotates", in the counterclockwise direction, IOIC's 4, 1, 2, and 3 will, sequentially, be granted access to the shared bus.

If a Processor Bus Operation cycle steal request (PBO CS REQUEST) is received by the request terminal of arbiter 10i2, it will be granted access to the shared bus provided the "allow arbitration" signal is positive, indicating that there is no signal which would prevent arbitration, and the "no IOIC command request" signal is positive, indicating there is no IOIC command request signal energizing the request terminal of arbiter 10i1.

If IOIC's 1, 2, 3, and 4 normal request signals energize the request terminal of arbiter 10i3, in accordance with the "rotation" of rotor 10i3b as shown in FIG. 2a, IOIC subunits 4, 1, 2, and 3 will be granted access to the shared bus provided the "no refresh pending" signal is positive, indicating that there is no refresh pending, the "no IOIC command request" signal is positive, indicating there are no IOIC command requests energizing the request terminal of arbiter 10i1, the "no PBO CS request" signal is positive indicating there is no PBO cycle steal request energizing the request terminal of arbiter 10i2, and the "allow arbitration" is also positive, indicating there is no operation in progress which would prevent arbitration from continuing.

If the I-Cache request signal energizes the request terminal of arbiter 10i4, the I-Cache will be granted access to the shared bus provided that the "no refresh pending" is positive, indicating there is no refresh pending, the "no IOIC command request" signal is positive, indicating there are no IOIC command requests energizing the request terminal of arbiter 10i1, the "no PBO CS request" signal is positive indicating there is no PBO cycle steal request energizing the request terminal of arbiter 10i2, the "no IOIC normal request" is positive, indicating there are no IOIC normal requests energizing the request terminal of arbiter 10i3, and the "allow arbitration" is also positive, indicating there is no operation in progress which would prevent arbitration from continuing. There is a second method of generating an I-Cache grant called the I-Cache preemptive grant. It is generated from the 10i4c AND gate if the "no higher requests" signal is positive, indicating arbiters 10i1, 10i2, and 10i3 do not have their respective request terminals active, the "no lower grants" signal is positive, indicating no grants were given to the D-Cache, the Bus Adapter, or refresh, and the "allow arbitration" as well as the "no refresh cycle" signals are positive, indicating that no data transfer operation or refresh operation is in progress.

In FIG. 2b, if the "D-cache request" signal is energizing the request terminal of arbiter 10i5, it will be granted access to the shared bus, and the "D-cache grant" signal will be developed from arbiter 10i5, provided that the "no refresh pending" signal, energizing gate 10i5a, is positive, indicating that there no refresh is pending, the "no IOIC cmd req" signal is positive, indicating that there are no command request signals energizing arbiter 10i1, the "no PBO cs req" signal is positive, indicating that the PBO cs request signal is not energizing arbiter 10i2, the "no IOIC normal req" signal is positive, indicating that there are no normal request signals energizing arbiter 10i3, the "no I-cache req" signal is positive, indicating that an I-cache request signal is not energizing arbiter 10i4, and the "allow arbitration" signal, energizing gate 10i5a, is positive.

If the "bus adapter request" signal is energizing the request terminal of arbiter 10i6, it will be granted access to the shared bus, and the "bus adapter grant" signal will be developed from arbiter 10i6 provided that all higher requests are not energizing the request terminals of arbiters 10i1 through 10i5, and provided that the "no refresh pending" and the "allow arbitration" signals, energizing gate 10i6a, are positive. Each of the signals energizing gate 10i6a must be positive in order to allow the "bus adapter request" signal access to the shared bus.

Referring to FIG. 2c, assume that a refresh request signal is energizing the request terminal of arbiter 10i7. However, assume that one of the signals energizing gate 10i7a is negative (this indicates that a higher request is energizing the request terminal of at least one of arbiters 10i1 through 10i6). Therefore, the signal energizing the enable terminal of arbiter 10i7 is negative, blocking the refresh signal from gaining access to the shared bus.

The negative signal, energizing the enable terminal, is inverted via inverter 10i7c, converting it to a positive signal which energizes one terminal of AND gate 10i7b, the other terminal of AND gate 10i7b being energized by the "refresh req" signal. An output from AND gate 10i7b sets latch 10i7d. As a result, an output from the Q output terminal energizes the request terminal of arbiter 10i8. An output signal is generated from arbiter 10i8 when the allow arbitration signal goes active at the end of the operation currently in progress. This signal energizes OR gate 10i9 which causes a "refresh grant signal to be generated." The refresh operation will commence immediately following the termination of the previous operation (the previous operation is causing one of the signals energizing gate 10i7a to be negative). This grant signal from OR gate 10i9 will also force the refresh pending latch 10i7d to be reset In FIGS. 5 through 7, a set of timing diagrams 1 through 3 illustrate a typical timing sequence of the arbitration process.

Figure 5:
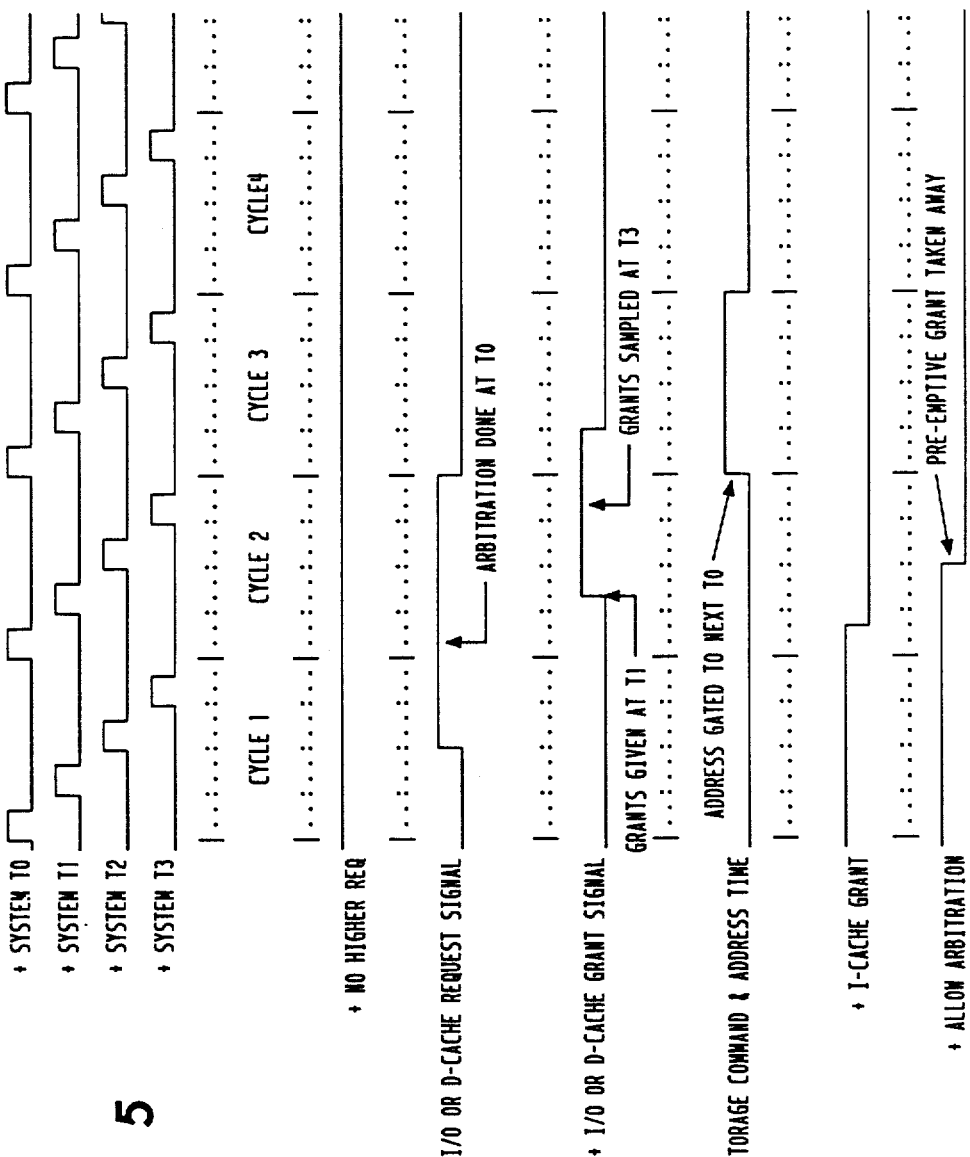
FIG. 5 represents a timing sequence for either an input/output (I/O) request or a Data Cache (D-cache) request.

In FIG. 5, timing diagram 1 depicts the timing sequence for either an I/O request or a D-Cache request. In cycle 1 the "NO HIGHER REQUEST" signal is positive, meaning no higher request than the current level of request is active, and "ALLOW ARBITRATION" signal is positive, meaning it is safe to arbitrate at the next T0. In cycle 2 the GRANT is given out at T1 to the unit whose request was active at T0. Note also the fact that the I-Cache grant signal is taken away since some other grant was activated during this cycle. The "allow arbitration" signal is deactivated to prevent further arbitration while the current operation is in progress. The requesting unit will continue to sample its grant signal at T3 until it finds the signal active, and will then place its command and address on the shared bus on the following cycle, in this case, cycle 3.

Figure 6:
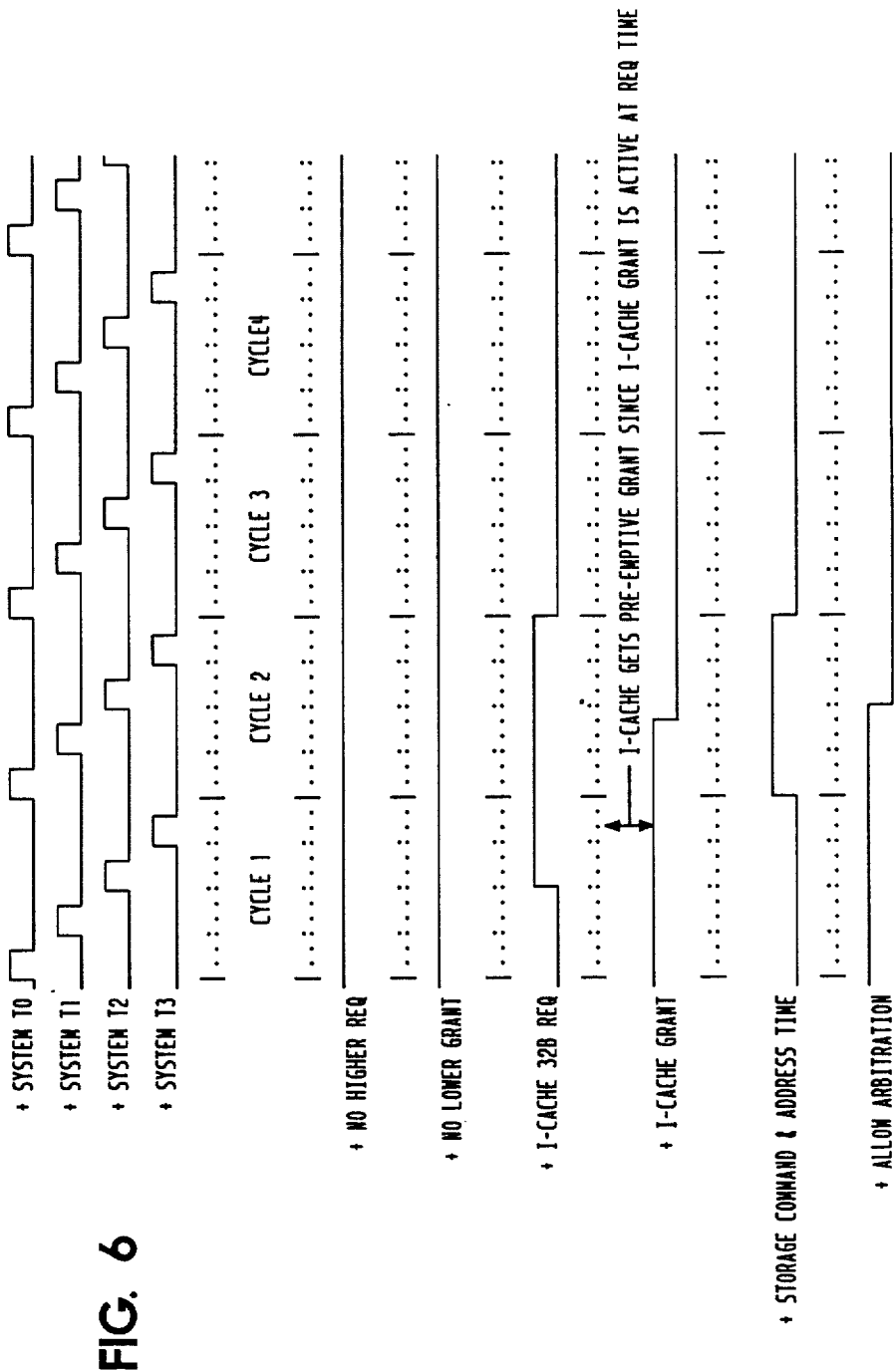
FIG. 6 represents an instruction cache (I-cache) request timing sequence when a shared facility is not active.

In FIG. 6, timing diagram 2 depicts the I-Cache request timing sequence when the shared facility is not active. The "NO HIGHER REQUEST" signal is positive, meaning no requests are active for devices with higher priority, the "NO LOWER GRANTS" signal is positive, meaning no grant was given to devices lower in priority during that cycle, and "ALLOW ARBITRATION" signal is positive, meaning it is safe to arbitrate on the next T0. In cycle 1, the I-Cache activates its request signal, and at the same time senses the grant signal for an active level. If both signals are active at T3, the I-Cache can then place its command and address on the shared bus during the next cycle, in this case cycle 2. Since the normal arbitration cycle, which would have taken place during cycle 2, has been bypassed, the command and address is able to be sent one cycle early, thus saving time and improving performance. This sequence is know as an I-Cache preemptive grant.

Figure 7:
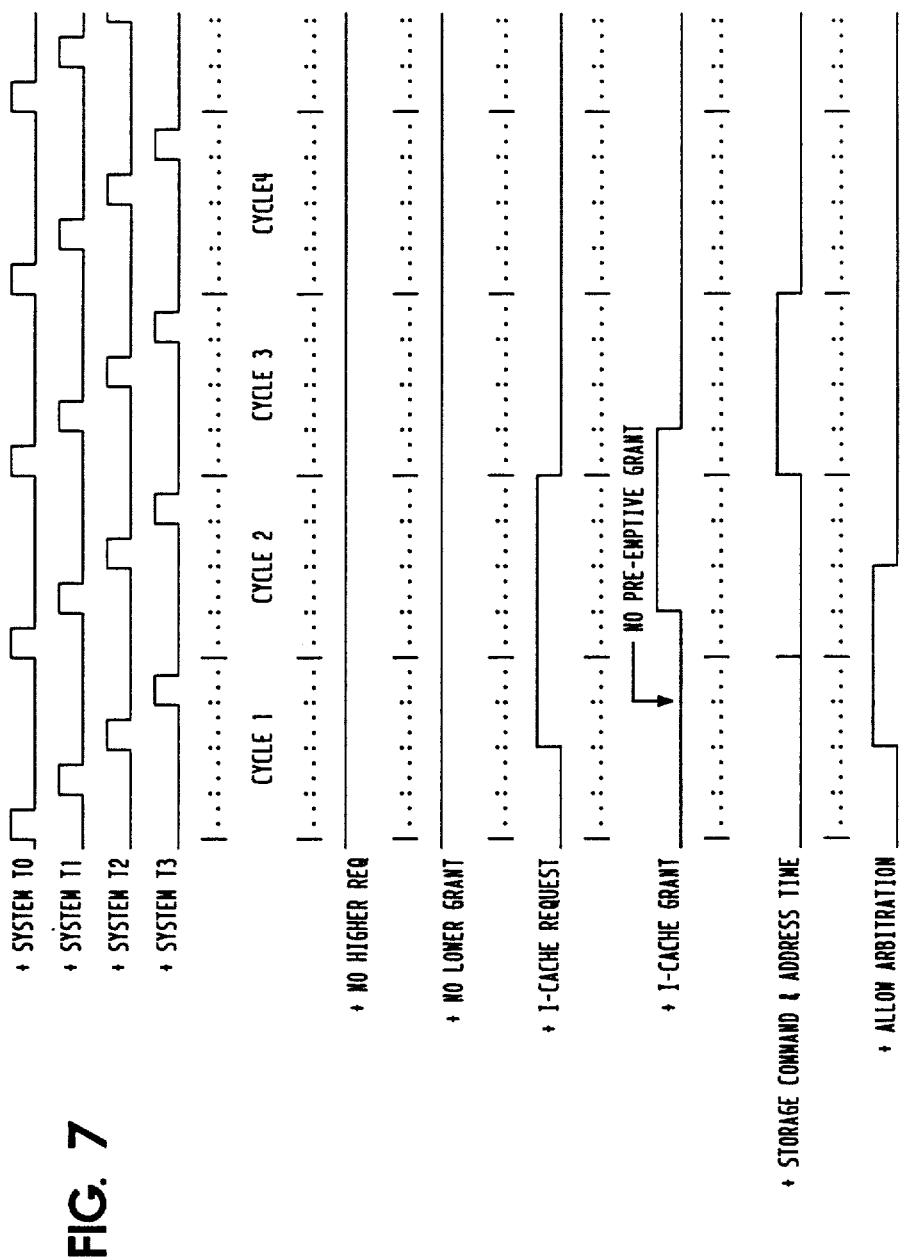
FIG. 7 represents a normal I-cache grant timing sequence when the shared facility is busy.

In FIG. 7, timing diagram 3, depicts the normal I-Cache grant sequence when the shared facility is busy. In cycle 1, the I-Cache request signal is activated, however, I-Cache grant is not active since the "ALLOW ARBITRATION" signal is inactive at T0. Arbitration takes place in cycle 2 since the "ALLOW ARBITRATION" signal is positive at T0. Since the "NO HIGHER REQUEST" signal is also positive, the arbiter activates the "I-CACHE GRANT" signal which is detected by the I-Cache at T3. The I-Cache then activates the command and address on the shared bus during cycle 3. This sequence is known as a normal I-Cache grant.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:

1. In a computer system including a shared bus and a plurality of subunits connected to the shared bus, an arbitration apprartus disposed externally to each of said subunits and responsive to an access request from each of the subunits for determining the priority by which each of said subunits shall access said shared bus when two or more of said subunits simultaneously seek access to the shared bus, said aribitratin apparatus comprising:

a plurality of individual arbiter means arranged in a particular configuraion for determining said priority by which each of said subunits shall access said shared bus, some arbiter means being higher in the particular configuration relative to one of said arbiter means and some arbiter means being lower in the particular configuration relative to said one of said arbiter means, each of said arbiter means having a request terminal adapted for receiving an access request signal form one of said subunits when said one of said subunits seeks access to said shared bus and an enable terminal adapted for receiving an enabling signal, said enabling signal energizing the enable terminal of said one of said arbiter means when said access request signal has not energized the request terminal of a higher arbiter means in the particular configuration relative to said one of said arbiter means, said one of said arbiter means developing a grant signal granting to a said access request signal access to said shared bus when said enabling signal energizes the enable terminal of said one of said arbiter means, said access request signal energizing the request terminal of said one of said arbiter means including a plurality of access request signals corresponding to a subset of said plurality of said subunits; and command storage means connected to said one of said arbiter means for storing a plurality of identification symbols therein identifying the members of said subset of said plurality of said subunits, said command storage means sequentially developing a plurality of output signals indicative of said plurality of identification symbols, each identification symbol of said plurality of identification symbols being stored at least one time in said command storage means, said one of said arbiter means granting to said plurality of access request signals sequential access to said shared bus in response to the sequentially developed plurality of output signals from said command storage means, wherein said plurality of identification symbols stored in said command storage means may be selectively changed to form a new set of identification symbols identifying the members of a new subset of said plurality of subunits, the time a particular subunit is granted access to the shared bus being dependent upon the number of times its corresponding identification symbol is stored in said command storage means.

2. The arbitration apparatus of claim 1, further comprising: gate means connected to an output of said one of said arbiter means and responsive to said grant signal from said one of said arbiter means, to a no higher requests signal indicating that no access request signal energizes an arbiter means which is higher in said particular configuration than said one of said arbiter means, and to a no lower grants signal indicating that no grant signal is developed from an arbiter means which is lower in said particular configuration than said one of said arbiter means for developing a further grant signal granting access to said shared bus in response to said grant signal from said one of said arbiter means and for developing a pre-emptive grant signal granting access to said shared bus in the absence of a said access request signal energizing the request terminal of said one of said arbiter means in response to said no higher requests signal and to said no lower grants signal, said one of said arbiter means having immediate access to said shared bus after said pre-emptive grant signal is developed when said access request signal energizes the request terminal of said one of said arbiter means.

3. The arbitration apparatus of claim 2, wherein said access request signal is an Instruction cache request signal developed from an Instruction Cache subunit disposed within said computer system.

4. The arbitration apparatus of claim 1, further comprising:

latch circuit means connected to an input of said one of said arbiter means and responsive to said access request signal and to said enabling signal for developing a set signal when said access request signal is received by said one of said arbiter means and said enabling signal is not received by said one of said arbiter means; and gating means connected to an output of said latch circuit means and responsive to said set signal and to an allow arbitration signal for developing an access grant signal, granting access to said shared bus, when said set signal and said allow arbitration signal is received by said gating means, said allow arbitration signal being generated and energizing said gating means when said enabling signal is received by said one of said arbiter means.

5. The arbitration apparatus of claim 4, wherein said enabling signal is not received by said one of said arbiter means when an access request signal is being received by said higher arbiter means in the particular configuration relative to said one of said arbiter means, whereby said access grant signal is developed, granting access to said shared bus, when an access request signal is not received by said higher arbiter means.

6. The arbitration apparatus of claim 5, wherein said access request signal energizing said one of said arbiter means is a refresh access request signal, said set signal being developed from said latch circuit means being a refresh pending signal, said access grant signal being a refresh grant signal.

* * * * *